(12) United States Patent
Kawamoto

(10) Patent No.: US 8,753,770 B2
(45) Date of Patent: Jun. 17, 2014

(54) ELECTRODE BODY, ALL SOLID STATE BATTERY ELEMENT, AND ALL SOLID STATE BATTERY

(75) Inventor: Koji Kawamoto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 136 days.

(21) Appl. No.: 13/055,043

(22) PCT Filed: Oct. 3, 2008

(86) PCT No.: PCT/JP2008/068070
§ 371 (c)(1),
(2), (4) Date: Jan. 20, 2011

(87) PCT Pub. No.: WO2010/038312
PCT Pub. Date: Apr. 8, 2010

(65) Prior Publication Data
US 2011/0177370 A1    Jul. 21, 2011

(51) Int. Cl.
*H01M 4/13* (2010.01)
*H01M 10/18* (2006.01)
*H01M 10/00* (2006.01)

(52) U.S. Cl.
USPC ............ 429/210; 429/94; 29/623.1; 29/623.3

(58) Field of Classification Search
None
See application file for complete search history.

(56) References Cited

U.S. PATENT DOCUMENTS 3,614,583 A * 10/1971 Burkett et al. ................ 320/129
6,022,640 A *  2/2000 Takada et al. ............ 429/231.95
6,329,101 B1 * 12/2001 Kawakami ................. 429/218.2
6,664,006 B1 * 12/2003 Munshi ......................... 429/305
2005/0153197 A1 *  7/2005 Coffey et al. ................... 429/94

FOREIGN PATENT DOCUMENTS

| JP | A-4-341766 | 11/1992 |
|---|---|---|
| JP | A-6-196203 | 7/1994 |
| JP | 2000-030746 | * 1/2000 |
| JP | A-2000-30746 | 1/2000 |
| JP | A-2000-100471 | 4/2000 |
| JP | 2001-236946 | * 8/2001 |
| JP | A-2001-236946 | 8/2001 |
| JP | A-2002-518816 | 6/2002 |
| JP | A-2002-216854 | 8/2002 |
| JP | A-2004-158222 | 6/2004 |
| JP | B2-3608047 | 1/2005 |
| JP | A-2006-185854 | 7/2006 |

(Continued)

OTHER PUBLICATIONS

Examiner Annotated Figures 3 and 4 of Aoki.*

(Continued)

*Primary Examiner* — Ula C Ruddock
*Assistant Examiner* — Matthew Van Oudenaren
(74) *Attorney, Agent, or Firm* — Oliff PLC

(57) ABSTRACT

An electrode body used for an all solid state battery element, having a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector.

11 Claims, 7 Drawing Sheets

(56) References Cited

FOREIGN PATENT DOCUMENTS

| JP | A-2007-95597 | 4/2007 |
| JP | A-2008-103285 | 5/2008 |
| WO | WO 99/66581 | 12/1999 |

OTHER PUBLICATIONS

International Search Report dated Jan. 27, 2009 in International Patent Application No. PCT/JP2008/068070.

* cited by examiner

FIG. 1
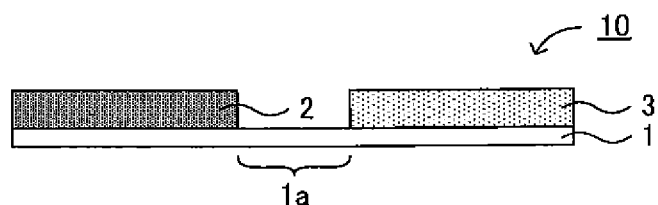
FIG. 2
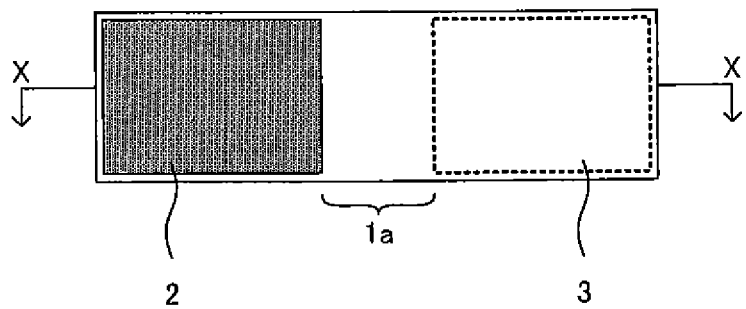
FIG. 3A
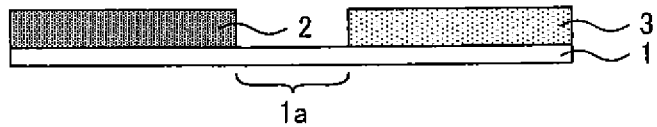
FIG. 3B
FIG. 4A
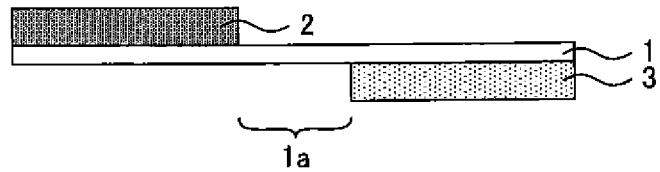
FIG. 5
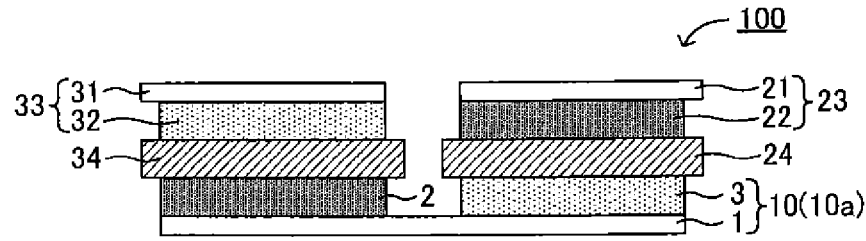

ELECTRODE BODY, ALL SOLID STATE BATTERY ELEMENT, AND ALL SOLID STATE BATTERY

TECHNICAL FIELD

The present invention relates to an electrode body to be used for an all solid state battery element, in which a short circuit is caused with difficulty.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric vehicle or a hybrid automobile has been advanced also in the technical field such as the automobile industry. A lithium battery has been presently receiving attention from the viewpoint of a high energy density among various kinds of batteries.

Organic liquid electrolyte having a flammable organic solvent as a solvent thereof is used for a presently commercialized lithium battery, so that the installation of a safety device for restraining temperature rise during a short circuit and the improvement in structure and material for preventing the short circuit are necessary therefor. On the contrary, with regard to an all solid lithium battery all-solidified by replacing the liquid electrolyte with a solid electrolyte, the flammable organic solvent is not used in the battery. Accordingly, the simplification of the safety device is promoted and thereby the battery attains excellent production cost and productivity.

On the other hand, in order to achieve higher output power and higher capacity of the battery, the all solid lithium battery having a bipolar structure is known. For example, the all solid lithium battery having a laminated bipolar structure is disclosed in Patent Documents 1 and 2. However, the problem is that the laminated bipolar structure is so narrow in a distance between electrodes that the short circuit is easily caused.

Patent Document 1: Japanese Patent Application Laid-Open No. 2000-100471
Patent Document 2: Japanese Patent Application Laid-Open No. 2004-158222
Patent Document 3: Japanese Patent Application Laid-Open No. 2007-95597
Patent Document 4: Japanese Patent Application Laid-Open No. 2000-30746
Patent Document 5: Japanese Patent No. 3,608,047
Patent Document 6: Japanese Patent Application Publication No. 2002-518816

DISCLOSURE OF THE INVENTION

Problems to be Solved by the Invention

The present invention has been made in view of the above-mentioned problems, and the main object thereof is to provide an electrode body to be used for an all solid state battery element, in which a short circuit is caused with difficulty.

Means for Solving the Problem

In order to achieve the above object, the present invention provides an electrode body being used for an all solid state battery element, comprising a bipolar electrode basic structure having: a current collector, a cathode active material layer formed on one surface of the current collector, an anode active material layer formed on a surface of the current collector and formed in a position not overlapping with the cathode active material layer in a plan view, and a current collector exposed portion, formed between the cathode active material layer and the anode active material layer, and exposing both surfaces of the current collector.

According to the present invention, an interval between the cathode active material layer and the anode active material layer may be determined so optionally that design freedom is improved and an all solid state battery element capable of being rolled up may be easily formed, for example. Thus, a short circuit may be caused with difficulty as compared with a conventional laminated bipolar structure.

In the above-mentioned invention, the above-mentioned anode active material layer is preferably formed on the same above-mentioned current collector surface as the above-mentioned cathode active material layer. The reason therefor is that the electrode body may be simply produced.

In the invention, the current collector preferably has: a backside cathode active material layer on a surface opposite to the surface where the cathode active material layer is formed, in a position overlapping with the cathode active material layer in a plan view; and a backside anode active material layer on a surface opposite to the surface where the anode active material layer is formed, in a position overlapping with the anode active material layer in a plan view. The reason therefor is that the achievement of higher capacity may be attained.

In the invention, it is preferable that a deterioration control treatment for restraining the current collector from deteriorating due to charge and discharge is performed on at least one of a contact surface between the cathode active material layer and the current collector and a contact surface between the anode active material layer and the current collector. The reason therefor is that the current collector may be further restrained from deteriorating due to charge and discharge.

In the invention, it is preferable that the deterioration control treatment is a plating treatment. The reason therefor is that deterioration control treatment may be easily performed.

Further, the present invention provides an all solid state battery element comprising: the electrode body described above, an end cathode structure having an end cathode current collector and an end cathode active material layer formed on the end cathode current collector, and an end anode structure having an end anode current collector and an end anode active material layer formed on the end anode current collector, wherein the cathode active material layer of the electrode body and the end anode active material layer of the end anode structure are connected through a solid electrolyte membrane for connecting the end anode structure, and the anode active material layer of the electrode body and the end cathode active material layer of the end cathode structure are connected through a solid electrolyte membrane for connecting the end cathode structure.

According to the present invention, the use of the above-mentioned electrode body allows the all solid state battery element in which the short circuit is caused with difficulty.

In the invention, it is preferable that the end cathode current collector of the end cathode structure has a backside end cathode active material layer on a surface opposite to a surface where the end cathode active material layer is formed, in a position overlapping with the end cathode active material layer in a plan view, and the end anode current collector of the end anode structure has a backside end anode active material layer on a surface opposite to a surface where the end anode active material layer is formed, in a position overlapping with the end anode active material layer in a plan view, and at least one electrode surface of the all solid state battery element is provided with a solid electrolyte membrane for rolling up. The reason therefor is that the achievement of higher capacity may be attained.

In the invention, the all solid state battery element preferably comprises the bipolar electrode basic structure by only one. For example, the reason therefor is to allow the all solid state battery element which is useful for the after-mentioned all solid state battery of a first embodiment.

In the invention, the all solid state battery element preferably comprises the bipolar electrode basic structure by plurality, wherein the cathode active material layer of one bipolar electrode basic structure is connected to the anode active material layer of the other bipolar electrode basic structure through a solid electrolyte membrane for connecting the bipolar electrode basic structure. For example, the reason therefor is to allow the all solid state battery element which is useful for the after-mentioned all solid state battery of a second embodiment or a third embodiment.

In the invention, it is preferable that the solid electrolyte membrane contains a solid electrolyte including an inorganic compound. The reason therefor is that the range of material selection widens.

The present invention provides an all solid state battery using an all solid state battery element having the following constitution:

(I) an electrode body comprising a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector;

(II) the above-mentioned current collector has: a backside cathode active material layer on a surface opposite to the surface where the above-mentioned cathode active material layer is formed, in a position overlapping with the above-mentioned cathode active material layer in a plan view; and a backside anode active material layer on a surface opposite to the surface where the above-mentioned anode active material layer is formed, in a position overlapping with the above-mentioned anode active material layer in a plan view;

(III) an end cathode structure having an end cathode current collector and an end cathode active material layer formed on the above-mentioned end cathode current collector, and an end anode structure having an end anode current collector and an end anode active material layer formed on the above-mentioned end anode current collector, in which the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure;

(IV) the end cathode current collector of the above-mentioned end cathode structure has a backside end cathode active material layer on a surface opposite to a surface where the above-mentioned end cathode active material layer is formed, in a position overlapping with the above-mentioned end cathode active material layer in a plan view, and the end anode current collector of the above-mentioned end anode structure has a backside end anode active material layer on a surface opposite to a surface where the above-mentioned end anode active material layer is formed, in a position overlapping with the above-mentioned end anode active material layer in a plan view, in which at least one electrode surface of the above-mentioned all solid state battery element is provided with a solid electrolyte membrane for rolling up; and (V) the above-mentioned bipolar electrode basic structure by only one;

wherein the above-mentioned all solid state battery element is rolled up using both an outside end of the above-mentioned end cathode structure and an outside end of the above-mentioned end anode structure as starting points, an end cathode structure side roll-up region is formed by rolling up using the outside end of the above-mentioned end cathode structure as the starting point, an end anode structure side roll-up region is formed by rolling up using the outside end of the above-mentioned end anode structure as the starting point, and an equipotential region formed by the current collector exposed portion of the above-mentioned bipolar electrode basic structure exists between the above-mentioned end cathode structure side roll-up region and the above-mentioned end anode structure side roll-up region.

According to the present invention, many power generating elements may be connected in series, so that the achievement of higher output may be attained.

The present invention provides an all solid state battery using an all solid state battery element having the following constitution:

(I) an electrode body having a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector;

(II) the above-mentioned current collector has: a backside cathode active material layer on a surface opposite to the surface where the above-mentioned cathode active material layer is formed, in a position overlapping with the above-mentioned cathode active material layer in a plan view; and a backside anode active material layer on a surface opposite to the surface where the above-mentioned anode active material layer is formed, in a position overlapping with the above-mentioned anode active material layer in a plan view, (III) an end cathode structure having an end cathode current collector and an end cathode active material layer formed on the above-mentioned end cathode current collector, and an end anode structure having an end anode current collector and an end anode active material layer formed on the above-mentioned end anode current collector, in which the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure; and (IV) the end cathode current collector of the above-mentioned end cathode structure has a backside end cathode active material layer on a surface opposite to a surface where the above-mentioned end cathode active material layer is formed, in a position overlapping with the above-mentioned end cathode active material layer in a plan view, and the end anode current collector of the above-mentioned end anode structure has a backside end anode active material layer on a surface opposite to a surface where the above-mentioned end anode active material layer is formed, in a position overlapping with the above-mentioned end anode active material layer in a plan view, in which at least one electrode surface of the above-mentioned all solid state battery element is provided with a solid electrolyte membrane for rolling up;

wherein the above-mentioned all solid state battery element is rolled up using an outside end of the above-mentioned end cathode structure or an outside end of the above-mentioned end anode structure as a starting point, a roll-up direction thereof is parallel to a direction from the above-mentioned cathode active material layer towards the above-mentioned anode active material layer in the above-mentioned bipolar electrode basic structure, and a length of the current collector exposed portion of the above-mentioned bipolar electrode basic structure is adjusted to the same as or longer than a perimeter of a roll-up body immediately before rolling up the current collector exposed portion.

According to the present invention, many power generating elements may be connected in-line, so that the achievement of higher output may be attained.

In the above-mentioned invention, a voltage sensing terminal is preferably provided for the above-mentioned current collector exposed portion. The reason therefor is that quality control is facilitated.

The present invention provides an all solid state battery using an all solid state battery element having the following constitution:

(I) an electrode body comprising a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector;

(II) the above-mentioned current collector has: a backside cathode active material layer on a surface opposite to the surface where the above-mentioned cathode active material layer is formed, in a position overlapping with the above-mentioned cathode active material layer in a plan view; and a backside anode active material layer on a surface opposite to the surface where the above-mentioned anode active material layer is formed, in a position overlapping with the above-mentioned anode active material layer in a plan view;

(III) an end cathode structure having an end cathode current collector and an end cathode active material layer formed on the above-mentioned end cathode current collector, and an end anode structure having an end anode current collector and an end anode active material layer formed on the above-mentioned end anode current collector, in which the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure; and (IV) the end cathode current collector of the above-mentioned end cathode structure has a backside end cathode active material layer on a surface opposite to a surface where the above-mentioned end cathode active material layer is formed, in a position overlapping with the above-mentioned end cathode active material layer in a plan view, and the end anode current collector of the above-mentioned end anode structure has a backside end anode active material layer on a surface opposite to a surface where the above-mentioned end anode active material layer is formed, in a position overlapping with the above-mentioned end anode active material layer in a plan view, in which at least one electrode surface of the above-mentioned all solid state battery element is provided with a solid electrolyte membrane for rolling up, wherein the above-mentioned all solid state battery element is rolled up using an end containing the above-mentioned end cathode active material layer, the above-mentioned cathode active material layer, the above-mentioned end anode active material layer and the above-mentioned anode active material layer as a starting point, and a roll-up direction thereof is orthogonal to a direction from the above-mentioned cathode active material layer towards the above-mentioned anode active material layer in the above-mentioned bipolar electrode basic structure.

According to the present invention, the large-area all solid state battery element may be accommodated so compactly that the achievement of higher capacity may be attained.

In the above-mentioned invention, an insulating exterior body for accommodating the above-mentioned all solid state battery element is preferably provided. The reason therefor is that reliability in preventing the short circuit is improved.

BRIEF DESCRIPTION OF THE DRAWINGS

FIG. 1 is a schematic cross-sectional view showing an example of an electrode body of the present invention.

FIG. 2 is a schematic plan view explaining an electrode body of the present invention.

FIGS. 3A and 3B are each an X-X cross-sectional view of FIG. 2.

FIG. 4A is a schematic cross-sectional view showing an example of an electrode body of the present invention.

FIG. 5 is a schematic cross-sectional view showing an example of an all solid state battery element of the present invention.

EXPLANATION OF REFERENCE NUMERALS

Figure 6:
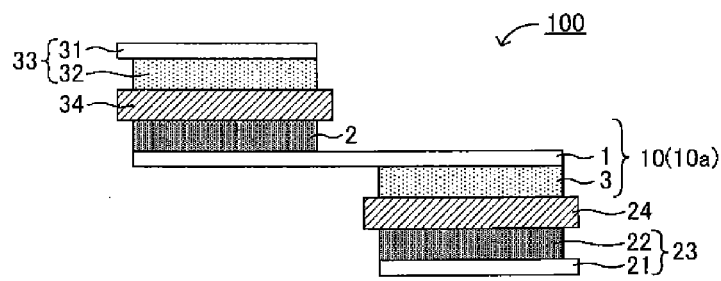
FIG. 6 is a schematic cross-sectional view showing another example of an all solid state battery element of the present invention.

1: current collector
2: cathode active material layer
2$x$: backside cathode active material layer
3: anode active material layer
3$x$: backside anode active material layer
4: solid electrolyte membrane for connecting bipolar electrode basic structure
5: current collection unit
6: voltage sensing terminal
10: electrode body
10$a$: bipolar electrode basic structure
21: end cathode current collector
22: end cathode active material layer
22$x$: backside end cathode active material layer
23: end cathode structure
24: solid electrolyte membrane for connecting end cathode structure
31: end anode current collector
32: end anode active material layer
32$x$: backside end anode active material layer
33: end anode structure
34: solid electrolyte membrane for connecting end anode structure
44: solid electrolyte membrane for rolling up
100: all solid state battery element
110: roll-up type element

BEST MODE FOR CARRYING OUT THE INVENTION

An electrode body, an all solid state battery element and an all solid state battery of the present invention are hereinafter described in detail.

A. Electrode Body

First, an electrode body of the present invention is described. The electrode body of the present invention is an electrode body used for an all solid state battery element, comprising a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector.

According to the present invention, an interval between the cathode active material layer and the anode active material layer may be determined so optionally that design freedom is improved and the all solid state battery element capable of being rolled up may be easily formed, for example. Thus, a short circuit may be caused with difficulty compared with a conventional laminated bipolar structure. The problem is that the conventional laminated bipolar structure is generally broken easily for the reason that the thickness of the cathode active material layer and the anode active material layer is thin. On the contrary, the cathode active material layer and the anode active material layer in the present invention may be formed by a coating method, may be formed into a layer with a sufficient thickness and may be made into the electrode body with a favorable mechanical strength. The problem is that the laminated bipolar structure is broken so easily while it is rolled up that the electrode body is downsized with difficulty. On the contrary, the electrode body of the present invention may be formed easily into the all solid state battery element capable of being rolled, so that it has the advantage that downsizing is easily attained.

The cathode active material layer and the anode active material layer in the present invention are formed on the same current collector. On the other hand, the electrode body in which a cathode current collector and an anode current collector are electrically connected is disclosed in the above-mentioned Patent Document 4 (for example, FIG. 7 of Patent Document 4) though not related to the electrode body of the all solid state battery element. As compared with such an electrode body, the electrode body of the present invention has the advantage that it can attain the lower resistance and the advantage of being excellent in mechanical strength and productivity.

In the case of the battery element using a liquid electrolyte and a gel electrolyte, the electrolyte generally contacts with the current collector. Thus, the formation of the cathode active material layer and the anode active material layer on the same current collector easily causes the current collector to deteriorate. On the contrary, the electrode body of the present invention is the electrode body used for the all solid state battery element. The all solid state battery element generally has a solid electrolyte membrane between the cathode active material layer and the anode active material layer, and the solid electrolyte does not contact with the current collector basically. Thus, the deterioration of the current collector is caused with such a difficulty that the cathode active material layer and the anode active material layer may be formed on the same current collector. In the present invention, an electrically stable membrane may be formed between the cathode active material layer or the anode active material layer and the current collector. Here, in the case of using the liquid electrolyte and the gel electrolyte, the electrolyte has such a flowability as to bring a possibility of breaking the membrane particularly during charge and discharge. On the contrary, in the all solid state battery element, the use of the solid electrolyte having no flowability prevents the break of the membrane. Thus, it is conceived that the cathode active material layer and the anode active material layer may be formed on the same current collector. In this manner, it is conceived that the electrode body in which the cathode active material layer and the anode active material layer are formed on the same current collector has a constitution unique to the electrode body used for the all solid state battery element.

FIG. 1 is a schematic cross-sectional view showing an example of the electrode body of the present invention. An electrode body 10 shown in FIG. 1 comprises a bipolar electrode basic structure having a current collector 1, a cathode active material layer 2 formed on one surface of the current collector 1, an anode active material layer 3 formed on a surface of the same current collector 1 as the cathode active material layer 2, and a current collector exposed portion 1a, formed between the cathode active material layer 2 and the anode active material layer 3, and exposing both surfaces of the current collector 1.

The electrode body of the present invention is hereinafter described in each constitution.

1. Cathode Active Material Layer

The cathode active material layer in the present invention is formed on one surface of the after-mentioned current collector. The cathode active material layer contains at least a cathode active material and may further contain a conductive material and a binder as required. The cathode active material layer preferably has a moderate flexibility for the reason that the electrode body of the present invention is used while rolled up, for example.

The cathode active material varies depending on kinds of conductive ions of the intended all solid state battery element, and examples thereof include $LiCoO_2$, $LiMnO_2$, $LiMn_2O_4$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Examples of the conductive material include acetylene black and carbon fiber. Examples of the binder include polyvinylidene fluoride (PVDF) and polytetrafluoroethylene (PTFE)

The thickness of the cathode active material layer is not particularly limited and is preferably within a range of 30 μm to 100 μm, for example. The length (a length in a crosswise direction in FIG. 1) of the cathode active material layer is preferably within a range of 5 cm to 20 m, for example. The width (a length in a depth direction in FIG. 1) of the cathode active material layer is preferably within a range of 5 cm to 20 m, for example. Examples of a method for forming the cathode active material layer include a method for coating a composition containing the cathode active material, the conductive material and the binder on the current collector. A press of the cathode active material layer may be further performed as required.

2. Anode Active Material Layer

Next, the anode active material layer in the present invention is described. The anode active material layer in the present invention is formed on a surface of the current collector and formed in a position not overlapping with the cathode active material layer in a plan view. "A position not overlapping with the cathode active material layer in a plan view" is described with reference to FIG. 2. FIG. 2 is a schematic plan view explaining the electrode body of the present invention. As shown in FIG. 2, the cathode active material layer 2 is formed on one surface of the current collector 1. With respect to this cathode active material layer 2, the anode active material layer 3 is formed in a position not overlapping with the cathode active material layer in a plan view. Specific examples thereof include the case where the anode active material layer 3 is formed on the same current collector surface as the cathode active material layer 2 (FIG. 3A) and the case where the anode active material layer 3 is formed on the opposite current collector surface to the cathode active material layer 2 (FIG. 3B), as shown in FIGS. 3A and 3B (an X-X cross-sectional view of FIG. 2). Among them, the anode active material layer 3 is preferably formed on the same current collector surface as the cathode active material layer 2. The reason therefor is that the electrode body may be simply produced.

The anode active material layer in the present invention contains at least an anode active material and may further contain a conductive material and a binder as required. The anode active material layer preferably has a moderate flexibility similarly to the above-mentioned cathode active material layer.

The anode active material varies depending on kinds of conductive ions of the intended all solid state battery element, and examples thereof include a metal active material and a carbon active material. Examples of the metal active material include In, Al, Si and Sn. The metal active material may be an inorganic oxide active material such as $Li_4Ti_5O_{12}$. On the other hand, examples of the carbon active material include mesocarbon microbeads (MCMB), high orientation property graphite (HOPG), hard carbon and soft carbon. The conductive material and the binder used for the anode active material layer are the same as the case of the above-mentioned cathode active material layer.

The thickness, the length and the width of the anode active material layer are similar to those explained in the case of the above-mentioned cathode active material layer. The anode active material layer is preferably larger in their values than those of the cathode active material layer from the viewpoint of restraining the short circuit due to Li precipitation. The length and/or the width of the anode active material layer are preferably larger by 0.5 mm or more compare to that/those of the cathode active material layer. Examples of a method for forming the anode active material layer include a method for coating a composition containing the anode active material, the conductive material and the binder on the current collector. A press of the anode active material layer may be further performed as required.

3. Current Collector

Next, the current collector in the present invention is described. The current collector used for the present invention is generally a foil-like current collector. A current collector exposed portion with both surfaces of the current collector exposed is formed between the above-mentioned cathode active material layer and anode active material layer.

A material for the current collector is not particularly limited if it has electrical conductivity, and preferably selected properly in consideration of electric potential of the respective material for the cathode active material and the anode active material. Specific examples thereof include aluminum, aluminum alloy, copper, nickel, silver and SUS. The thickness of the current collector is the same as the thickness of a current collector in a general all solid state battery element. The length and the width of the current collector are preferably determined properly in accordance with the object.

As described above, the electrode body of the present invention is used for the all solid state battery element, so that the cathode active material layer and the anode active material layer may be basically formed directly on the same current collector. On the other hand, deterioration control treatment for restraining the current collector from deteriorating due to charge and discharge is preferably performed on at least one of a contact surface between the cathode active material layer and the current collector and a contact surface between the anode active material layer and the current collector from the viewpoint of further restraining the current collector from deteriorating due to charge and discharge.

Examples of the deterioration control treatment include a plating treatment, a sputtering treatment and a cladding treatment. Examples of the current collector with the deterioration control treatment performed include the current collector in which the material therefor is aluminum and a copper thin film is formed on the contact surface between the anode active material layer and the current collector; the current collector in which the material therefor is copper and an aluminum thin film is formed on the contact surface between the cathode active material layer and the current collector; and the current collector in which the material therefor is an optional conductive material, an aluminum thin film is formed on the contact surface between the cathode active material layer and the current collector, and a copper thin film is formed on the contact surface between the anode active material layer and the current collector.

4. Electrode Body

The electrode body of the present invention has the above-mentioned cathode active material layer, anode active material layer and current collector. In addition, in the present invention, a backside cathode active material layer and a backside anode active material layer are preferably formed on the current collector. The reason therefor is that the achievement of higher capacity may be attained. Specifically, as shown in FIG. 4A, the current collector 1 preferably has a backside cathode active material layer $2x$ on a surface opposite to the surface where the cathode active material layer 2 is formed, in a position overlapping with the cathode active material layer 2 in a plan view, and a backside anode active material layer $3x$ on a surface opposite to the surface where the anode active material layer 3 is formed, in a position overlapping with the anode active material layer 3 in a plan view. Also, in the present invention, the backside cathode active material layer $2x$ may overlap with the cathode active material layer 2 by at least one part in a plan view, and may be any of the case of being larger than the cathode active material layer 2, the case of being smaller than the cathode active material layer 2 and the case of being the same in size as the cathode active material layer 2 in a plan view. This is the same also with regard to the backside anode active material layer $3x$. The respective material, thickness and forming method of the backside cathode active material layer and the backside anode active material layer are the same as those of the above-mentioned cathode active material layer and anode active material layer. In addition, the above-mentioned deterioration control treatment may be performed on at least one of a contact surface between the backside cathode active material layer and the current collector and a contact surface between the backside anode active material layer and the current collector.

B. All Solid State Battery Element

Next, the all solid state battery element of the present invention is described. The all solid state battery element of the present invention comprises: the above-mentioned electrode body, an end cathode structure having an end cathode current collector and an end cathode active material layer formed on the above-mentioned end cathode current collector, and an end anode structure having an end anode current collector and an end anode active material layer formed on the above-mentioned end anode current collector, wherein the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure.

According to the present invention, the use of the above-mentioned electrode body allows the all solid state battery element in which the short circuit is caused with difficulty.

FIG. 5 is a schematic cross-sectional view showing an example of the all solid state battery element of the present invention. The all solid state battery element 100 shown in FIG. 5 comprises: the electrode body 10 having the current collector 1, the cathode active material layer 2 and the anode current collector 3; the end cathode structure 23 having the end cathode current collector 21 and the end cathode active material layer 22 formed on the end cathode current collector 21; and the end anode structure 33 having the end anode current collector 31 and the end anode active material layer 32 formed on the end anode current collector 31. Here, the cathode active material layer 2 and the end anode active material layer 32 are connected through the solid electrolyte membrane 34 for connecting the end anode structure. Similarly, the anode active material layer 3 and the end cathode active material layer 22 are connected through the solid electrolyte membrane 24 for connecting the end cathode structure.

The all solid state battery element of the present invention is hereinafter described in each constitution.

1. Electrode Body

The electrode body in the present invention is the same as the contents described in the above-mentioned "A. Electrode body"; therefore, the description herein is omitted.

2. End Cathode Structure and End Anode Structure

The end cathode structure in the present invention has the end cathode current collector and the end cathode active material layer formed on the end cathode current collector. On the other hand, the end anode structure in the present invention has the end anode current collector and the end anode active material layer formed on the end anode current collector. The end cathode current collector and the end anode current collector are the same as the current collector of the above-mentioned electrode body, and the end cathode active material layer and the end anode active material layer are the same as the cathode active material layer and the anode active material layer of the above-mentioned electrode body, respectively; therefore, the description herein is omitted. Generally, materials for these are the same as the materials in the above-mentioned electrode body.

3. Solid Electrolyte Membrane

Next, the solid electrolyte membrane in the present invention is described. The all solid state battery element of the present invention has the solid electrolyte membrane 24 for connecting the end cathode structure and the solid electrolyte membrane 34 for connecting the end anode structure, as shown in the above-mentioned FIG. 5. As described later, the all solid state battery element occasionally has a solid electrolyte membrane for connecting the bipolar electrode basic structure and a solid electrolyte membrane for rolling up.

A solid electrolyte used for these solid electrolyte membranes is not particularly limited if it has ionic conductivity, and examples thereof include a solid electrolyte composed of an inorganic compound and a solid electrolyte composed of a polymer. In addition, examples of the solid electrolyte composed of an inorganic compound include a sulfide solid electrolyte and an oxide solid electrolyte. Examples of the sulfide solid electrolyte include $Li_2S$—$P_2S_5$, $70Li_2S$-$30P_2S_5$, $80Li_2S$-$20P_2S_5$, $Li_2S$—$SiS_2$ and $LiGe_{0.25}P_{0.75}S_4$.

The solid electrolyte membrane preferably has a moderate flexibility for the reason that the all solid state battery element of the present invention is used by rolling it up, for example. Thus, the solid electrolyte membrane preferably contains the binder or the like in addition to the above-mentioned solid electrolyte. The thickness of the solid electrolyte membrane is not particularly limited and is preferably within a range of 5 μm to 30 μm, for example.

4. All Solid State Battery Element

The all solid state battery element of the present invention comprises the electrode body having the bipolar electrode basic structure, the end cathode structure, the end anode structure and the solid electrolyte membrane. The all solid state battery element of the present invention is hereinafter described in further detail while divided into (1) the case of having the bipolar electrode basic structure by only one and (2) the case of having the bipolar electrode basic structure by plurality.

(1) The Case of Having the Bipolar Electrode Basic Structure by Only One

This all solid state battery element is useful for an all solid state battery of the after-mentioned first to third embodiments, for example, and particularly useful for an all solid state battery of the first embodiment. Examples of such an all solid state battery element include the all solid state battery element 100 comprising a bipolar electrode basic structure 10a by only one, in which the bipolar electrode basic structure 10a has the current collector 1, the cathode active material layer 2 formed on one surface of the current collector 1 and the anode active material layer 3 formed on a surface of the same current collector 1 as the cathode active material layer 2, as shown in the above-mentioned FIG. 5. On the other hand, as shown in FIG. 6, the all solid state battery element 100 may comprise the bipolar electrode basic structure 10a by only one, in which the cathode active material layer 2 and the anode active material layer 3 are formed on different surfaces of the current collector 1.

As shown in the above-mentioned FIG. 4, the current collector 1 of the electrode body used for the present invention may have the backside cathode active material layer 2x and the backside anode active material layer 3x. In this case, the end cathode current collector and the end anode current collector preferably have a backside end cathode active material layer and a backside end anode active material layer, respectively.

Figure 7:
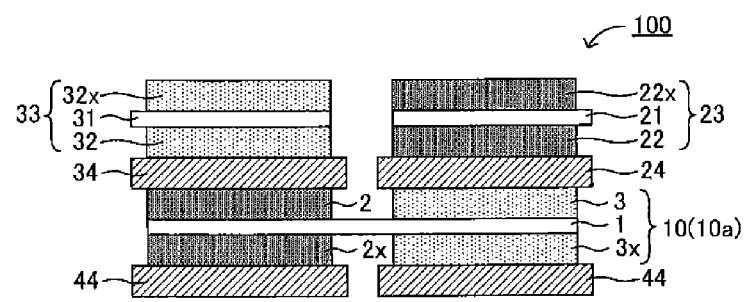
FIG. 7 is a schematic cross-sectional view showing also another example of an all solid state battery element of the present invention.

Specifically, as shown in FIG. 7, the current collector 1 preferably has the backside cathode active material layer 2x on a surface opposite to the surface where the cathode active material layer 2 is formed, in a position overlapping with the cathode active material layer 2 in a plan view, and the backside anode active material layer 3x on a surface opposite to the surface where the anode active material layer 3 is formed, in a position overlapping with the anode active material layer 3 in a plan view. In addition, it is preferable that the end cathode current collector 21 of the end cathode structure 23 has a backside end cathode active material layer 22x on a surface opposite to a surface where the end cathode active material layer 22 is formed, in a position overlapping with the end cathode active material layer 22 in a plan view, and the end anode current collector 31 of the end anode structure 33 has a backside end anode active material layer 32x on a surface on the opposite a surface where the end anode active material layer 32 is formed, in a position overlapping with the end anode active material layer 32 in a plan view. In addition, in this case, at least one electrode surface of the all solid state battery element 100 is preferably provided with a solid electrolyte membrane 44 for rolling up.

In the present invention, the above-mentioned deterioration control treatment may be performed on a contact surface between the backside end cathode active material layer and the end cathode current collector and a contact surface between the backside end anode active material layer and the end anode current collector.

(2) The Case of Having the Bipolar Electrode Basic Structure by Plurality

Figure 8:
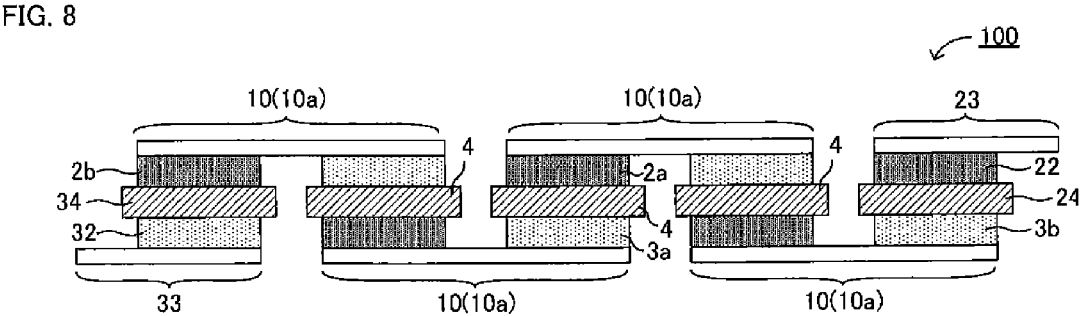
FIG. 8 is a schematic cross-sectional view showing yet another example of an all solid state battery element of the present invention.
Figure 9:
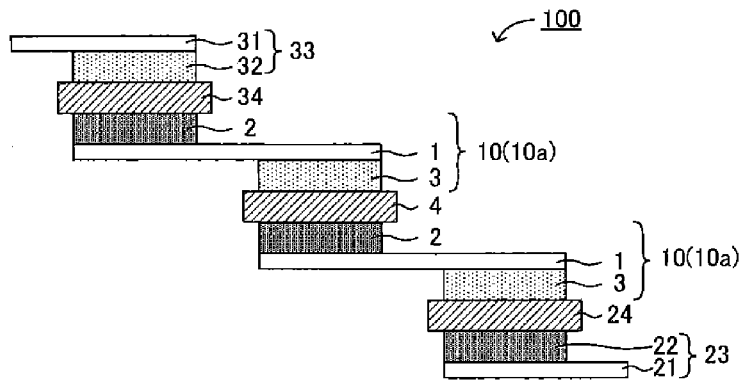
FIG. 9 is a schematic cross-sectional view showing still another example of an all solid state battery element of the present invention.

This all solid state battery element is useful for an all solid state battery of the after-mentioned second embodiment and third embodiment, for example. Examples of such an all solid state battery element include the all solid state battery element having the bipolar electrode basic structure lea by plurality (four pieces in FIG. 8), in which the bipolar electrode basic structure 10a has the current collector 1, the cathode active material layer 2 formed on one surface of the current collector 1 and the anode active material layer 3 formed on a surface of the same current collector 1 as the cathode active material layer 2, as shown in FIG. 8. Here, a cathode active material layer 2a of one bipolar electrode basic structure 10a is connected to an anode active material layer 3a of the other bipolar electrode basic structure 10a through a solid electrolyte membrane 4 for connecting the bipolar electrode basic structure. In addition, a cathode active material layer 2b of an end of the bipolar electrode basic structure 10a and the end anode active material layer 32 of the end anode structure 33 are connected through the solid electrolyte membrane 34 for connecting the end anode structure. Similarly, an anode active material layer 3b of an end of the bipolar electrode basic structure 10a and the end cathode active material layer 22 of the end cathode structure 23 are connected through the solid electrolyte membrane 24 for connecting the end cathode structure. On the other hand, as shown in FIG. 9, the all solid state battery element 100 may comprise the bipolar electrode basic structure 10a by plurality, in which the cathode active material layer 2 and the anode active material layer 3 are formed on different surfaces of the current collector 1.

As shown in the above-mentioned FIG. 4, the current collector 1 of the electrode body used for the present invention may have the backside cathode active material layer 2x and the backside anode active material layer 3x. In this case, the end cathode current collector and the end anode current collector preferably have a backside end cathode active material layer and a backside end anode active material layer, respectively.

Figure 10:
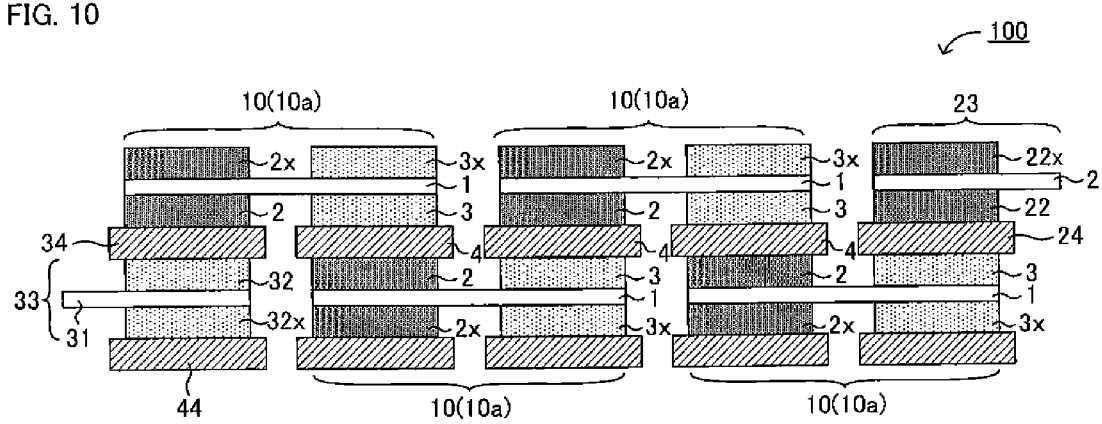
FIG. 10 is a schematic cross-sectional view showing still yet another example of an all solid state battery element of the present invention.

Specifically, as shown in FIG. 10, the current collector 1 preferably has the backside cathode active material layer 2x on a surface opposite to the surface where the cathode active material layer 2 is formed, in a position overlapping with the cathode active material layer 2 in a plan view, and the backside anode active material layer 3x on a surface opposite to the surface where the anode active material layer 3 is formed, in a position overlapping with the anode active material layer 3 in a plan view. In addition, it is preferable that the end cathode current collector 21 of the end cathode structure 23 has the backside end cathode active material layer 22x on a surface opposite to a surface where the end cathode active material layer 22 is formed, in a position overlapping with the end cathode active material layer 22 in a plan view, and the end anode current collector 31 of the end anode structure 33 has the backside end anode active material layer 32x on a surface opposite to a surface where the end anode active material layer 32 is formed, in a position overlapping with the end anode active material layer 32 in a plan view. In addition, in this case, at least one electrode surface of the all solid state battery element 100 is preferably provided with the solid electrolyte membrane 44 for rolling up.

In the case where the all solid state battery element of the present invention has the bipolar electrode basic structure by plurality, the number thereof is not particularly limited and is preferably within a range of 2 to 100 pieces, for example.

5. Others

The all solid state battery element of the present invention is preferably an element for an all solid lithium battery, for example, and more preferably an element for an all solid lithium secondary battery. The shape of the all solid state battery element of the present invention is not particularly limited and may be the after-mentioned roll-up (a roll-up type) or a band shape before being rolled up. Specific examples of the roll-up type include a cylindrical type and a square type.

C. All Solid State Battery

Next, the all solid state battery of the present invention is described. In the all solid state battery of the present invention, the above-mentioned all solid state battery element is used.

According to the present invention, the use of the above-mentioned all solid state battery element allows the all solid state battery in which the short circuit is caused with difficulty. The all solid state battery element used for the present invention is the same as the contents described in the above-mentioned "B. All solid state battery element".

The shape of the all solid state battery element in the present invention is not particularly limited and preferably selected properly in accordance with the shape of the intended all solid state battery. Above all, part or all of the all solid state battery element in the present invention is preferably rolled up. On the occasion of rolling up the all solid state battery element, a proper disposition of an insulating member as required allows various kinds of roll-up type elements.

Specific examples of the all solid state battery of the present invention are hereinafter described while divided into first to third embodiments.

1. First Embodiment

A first embodiment of the all solid state battery of the present invention is first described. The all solid state battery element with the following constitution is used in the all solid state battery of the first embodiment.

The constitution of the all solid state battery element of the first embodiment has:

(I) an electrode body comprising a bipolar electrode basic structure having a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector;

(II) the above-mentioned current collector has: a backside cathode active material layer on a surface opposite to the surface where the above-mentioned cathode active material layer is formed, in a position overlapping with the above-mentioned cathode active material layer in a plan view; and a backside anode active material layer on a surface opposite to the surface where the above-mentioned anode active material layer is formed, in a position overlapping with the above-mentioned anode active material layer in a plan view;

(III) an end cathode structure having an end cathode current collector and an end cathode active material layer formed on the above-mentioned end cathode current collector, and an end anode structure having an end anode current collector and an end anode active material layer formed on the above-mentioned end anode current collector, in which the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure;

(IV) the end cathode current collector of the above-mentioned end cathode structure has a backside end cathode active material layer on a surface opposite to a surface where the above-mentioned end cathode active material layer is formed, in a position overlapping with the above-mentioned end cathode active material layer in a plan view, and the end anode current collector of the above-mentioned end anode structure has a backside end anode active material layer on a surface opposite to a surface where the above-mentioned end anode active material layer is formed, in a position overlapping with the above-mentioned end anode active material layer in a plan view, in which at least one electrode surface of the above-mentioned all solid state battery element is provided with a solid electrolyte membrane for rolling up; and (V) the above-mentioned bipolar electrode basic structure by only one.

In addition, in the all solid state battery of the first embodiment, the all solid state battery element is rolled up using both an outside end of the above-mentioned end cathode structure and an outside end of the above-mentioned end anode structure as starting points, an end cathode structure side roll-up region is formed by rolling up using the outside end of the above-mentioned end cathode structure as the starting point, an end anode structure side roll-up region is formed by rolling up using the outside end of the above-mentioned end anode structure as the starting point, and an equipotential region formed by the current collector exposed portion of the above-mentioned bipolar electrode basic structure exists between the above-mentioned end cathode structure side roll-up region and the above-mentioned end anode structure side roll-up region.

Figure 11A:
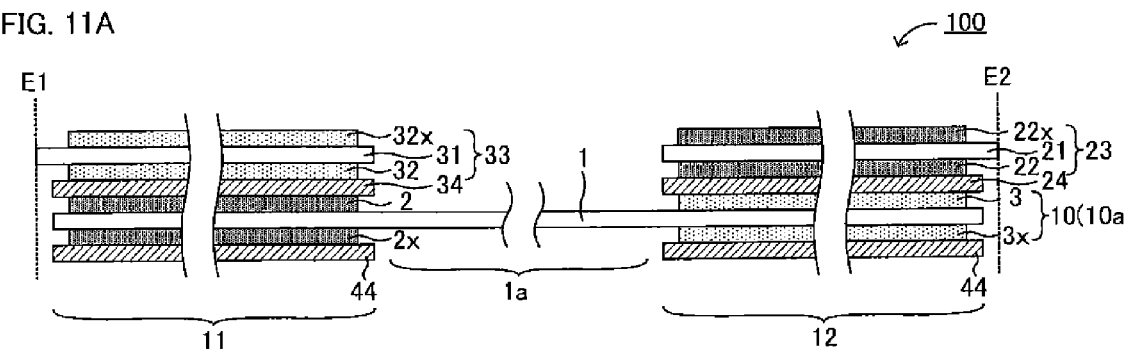
FIGS. 11A to 11E are an explanatory view explaining an all solid state battery element to be used for an all solid state battery of a first embodiment.

FIG. 11A to 11E are an explanatory view explaining the all solid state battery element to be used for the all solid state battery of the first embodiment. The all solid state battery element 100 shown in FIG. 11A is the same element as the above-mentioned FIG. 7, and has the bipolar electrode basic structure 10a by only one. In addition, the cathode active material layer 2, the backside cathode active material layer 2x, the anode active material layer 3 and the backside anode active material layer 3x are formed on the current collector 1. The end cathode active material layer 22 and the backside end cathode active material layer 22x are formed on the end cathode current collector 21. The end anode active material layer 32 and the backside end anode active material layer 32x are formed on the end anode current collector 31. Here, the length (a length in a crosswise direction in the figure) of an electrode laminated body 11 including the cathode active material layer 2 is not particularly limited and preferably within a range of 50 cm to 20 m, for example. The width (a length in a depth direction in the figure) of the electrode laminated body 11 including the cathode active material layer 2 is preferably within a range of 50 mm to 300 mm, for example. The length and the width of an electrode laminated body 12 including the anode active material layer 3 are the same.

Figure 11B:
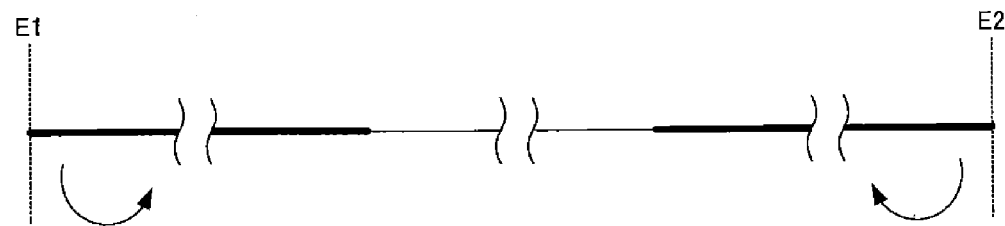

FIG. 11B is a view showing FIG. 11A more abstractly. As shown in FIG. 11B, the all solid state battery element used for the first embodiment is rolled up using both an outside end E2 of the end cathode structure 23 and an outside end E1 of the end anode structure 33 as starting points. On this occasion, the backside end cathode active material layer 22x is rolled up through the solid electrolyte membrane 94 for rolling up formed on a surface of the backside anode active material layer 3x so as to contact with the backside anode active material layer 3x. Similarly, the backside end anode active material layer 32x is rolled up through the solid electrolyte membrane 44 for rolling up formed on a surface of the backside cathode active material layer 2x so as to contact with the backside cathode active material layer 2x. A roll-up direction may be opposite to the direction shown in FIG. 11B.

Figure 11C:
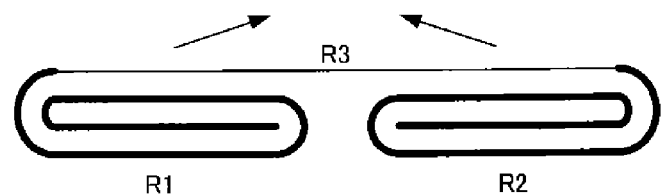
Figure 11D:
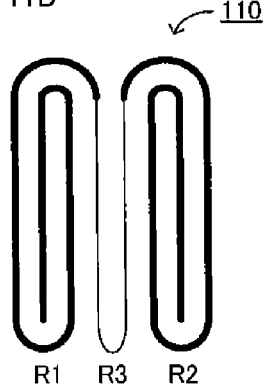
Figure 11E:
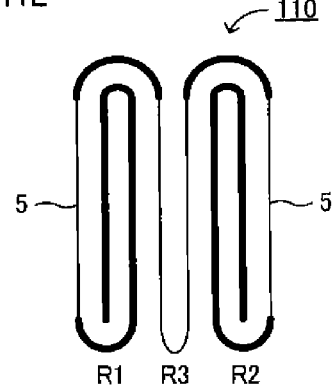

An end cathode structure side roll-up region R2 and an end anode structure side roll-up region R1 are formed by rolling up the all solid state battery element 100, as shown in FIG. 11C. In addition, an equipotential region R3 formed by the current collector exposed portion 1a of the bipolar electrode basic structure 10a exists between the end cathode structure side roll-up region R2 and the end anode structure side roll-up region. Lastly, a roll-up type element 110 as shown in FIG. 11D is obtained by folding back the equipotential region R3. Generally, as shown in FIG. 11E, a current collection unit 5 is formed outside each of the end cathode structure side roll-up region R2 and the end anode structure side roll-up region R1. Such a current collection unit may be formed by previously exposing the current collector portion in a position such as to become the current collection unit, for example.

According to the first embodiment, many power generating elements may be connected in series, so that the achievement of higher output may be attained. As compared with the laminated bipolar structure, the lamination number of the electrode is so small as to have the advantage of being broken with difficulty even when it is rolled up.

Figure 12A:
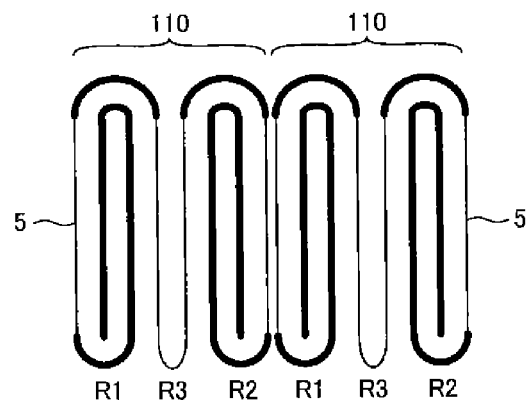
FIGS. 12A and 12B are each an explanatory view explaining an all solid state battery element to be used for an all solid state battery of a first embodiment.
Figure 12B:
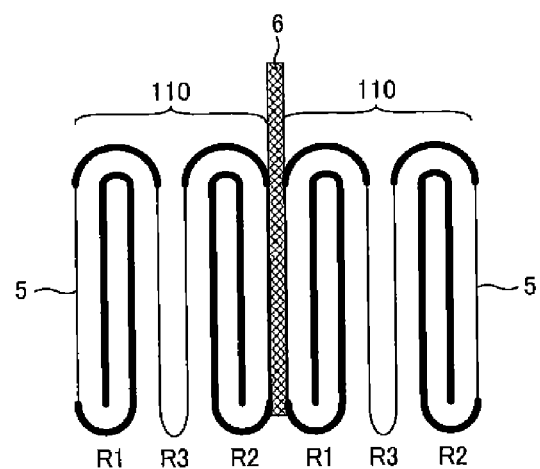

In the present invention, the roll-up type element 110 as shown in FIG. 11E may be connected in series by two pieces or more. Specifically, as shown in FIG. 12A, two roll-up type elements 110 may be prepared to connect both in series in such a manner that the current collection units inside these are connected by welding and subjected to pressure treatment. On this occasion, as shown in FIG. 12E, a voltage sensing terminal 6 is preferably disposed between two roll-up type elements 110.

2. Second Embodiment

Next, a second embodiment of the all solid state battery of the present invention is described. The all solid state battery element with the following constitution is used in the all solid state battery of the second embodiment.

The constitution of the all solid state battery element of the second embodiment has:

(I) an electrode body having a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector;

(II) the above-mentioned current collector has: a backside cathode active material layer on a surface opposite to the surface where the above-mentioned cathode active material layer is formed, in a position overlapping with the above-mentioned cathode active material layer in a plan view; and a backside anode active material layer on a surface opposite to the surface where the above-mentioned anode active material layer is formed, in a position overlapping with the above-mentioned anode active material layer in a plan view;

(III) an end cathode structure having an end cathode current collector and an end cathode active material layer formed on the above-mentioned end cathode current collector, and an end anode structure having an end anode current collector and an end anode active material layer formed on the above-mentioned end anode current collector, in which the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure; and (IV) the end cathode current collector of the above-mentioned end cathode structure has a backside end cathode active material layer on a surface opposite to a surface where the above-mentioned end cathode active material layer is formed, in a position overlapping with the above-mentioned end cathode active material layer in a plan view, and the end anode current collector of the above-mentioned end anode structure has a backside end anode active material layer on a surface on the opposite side to a surface where the above-mentioned end anode active material layer is formed, in a position overlapping with the above-mentioned end anode active material layer in a plan view, in which at least one electrode surface of the above-mentioned all solid state battery element is provided with a solid electrolyte membrane for rolling up.

In addition, in the all solid state battery of the second embodiment, the all solid state battery element is rolled up using an outside end of the above-mentioned end cathode structure or an outside end of the above-mentioned end anode structure as a starting point, a roll-up direction thereof is parallel to a direction from the above-mentioned cathode active material layer towards the above-mentioned anode active material layer in the above-mentioned bipolar electrode basic structure, and a length of the current collector exposed portion of the above-mentioned bipolar electrode basic structure is adjusted to the same as or longer than a perimeter of a roll-up body immediately before rolling up the current collector exposed portion.

Figure 13:
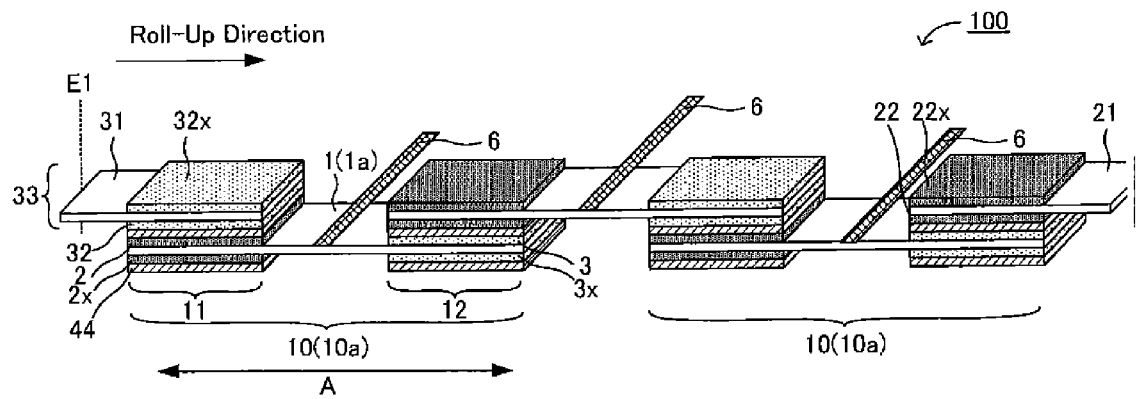
FIG. 13 is a perspective view explaining an all solid state battery element to be used for an all solid state battery of a second embodiment.

FIG. 13 is a perspective view explaining the all solid state battery element to be used for the all solid state battery of the second embodiment. The all solid state battery element 100 shown in FIG. 13 is the same element as the above-mentioned FIG. 10, and comprises the bipolar electrode basic structure 10a by plurality. The all solid state battery element 100 to be used may comprise the bipolar electrode basic structure 10a by only one. The cathode active material layer 2, the backside cathode active material layer 2x, the anode active material layer 3 and the backside anode active material layer 3x are formed on the current collector 1. The end cathode active material layer 22 and the backside end cathode active material layer 22x are formed on the end cathode current collector 21. The end anode active material layer 32 and the backside end anode active material layer 32x are formed on the end anode current collector 31. In addition, the voltage sensing terminal 6 is disposed on the current collector exposed portion 1a. Here, the length (a length in a crosswise direction in the figure) of an electrode laminated body 11 including the cathode active material layer 2 is not particularly limited and preferably within a range of 10 cm to 1 m, for example. The width (a length in a depth direction in the figure) of the electrode laminated body 11 including the cathode active material layer 2 is preferably within a range of 5 cm to 50 cm, for example. The length and the width of an electrode laminated body 12 including the anode active material layer 3 are the same. The number of the bipolar electrode basic structures 10a is not particularly limited and is preferably within a range of 2 to 100 pieces, for example.

In FIG. 13, the all solid state battery element 100 is rolled up using an outside end E1 of the end anode structure 33 as a starting point, and a roll-up direction thereof is parallel to a direction A from the cathode active material layer 2 towards the anode active material layer 3 in the bipolar electrode basic structure 10a. On this occasion, in rolling up the most left electrode laminated body 11 in the figure, the backside end anode active material layer 32x is rolled up through the solid electrolyte membrane 44 for rolling up formed on a surface of the backside cathode active material layer 2x so as to contact with the backside cathode active material layer 2x. Thereafter, the all solid state battery element 100 is sequentially rolled up.

Figure 14:
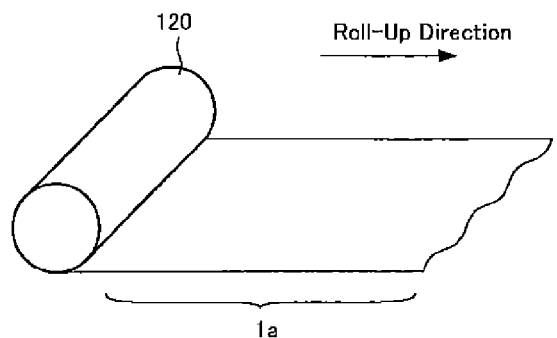
FIG. 14 is another perspective view explaining an all solid state battery element to be used for an all solid state battery of a second embodiment.
Figure 15:
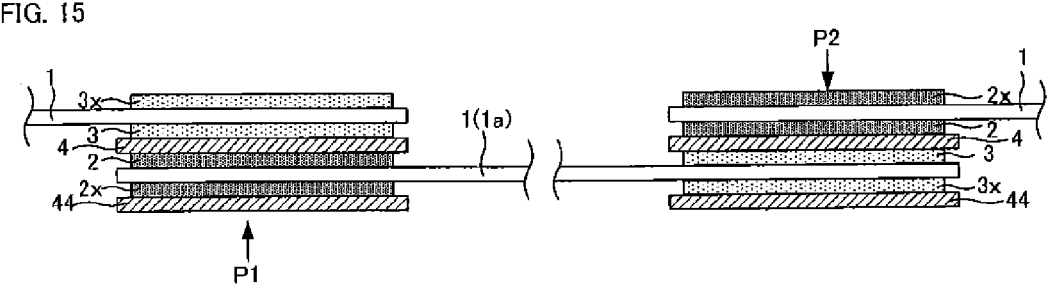
FIG. 15 is a schematic cross-sectional view explaining an all solid state battery element to be used for an all solid state battery of a second embodiment.

In the second embodiment, a length of the current collector exposed portion 1a is adjusted to the same as or longer than a perimeter of a roll-up body immediately before rolling up the current collector exposed portion 1a. Specifically, as shown in FIG. 14, the length of the current collector exposed portion 1a is adjusted to the same as or longer than a perimeter of a roll-up body 120. Generally, the length of the current collector exposed portion increases as the rolling up progresses. In the second embodiment, the length of the current collector exposed portion may be adjusted in accordance with the position, or the same regardless of the position. The adjustment of the length of the current collector exposed portion, as shown in FIG. 15, prevents P1 and P2 from contacting and prevents the short circuit from causing.

Figure 16:
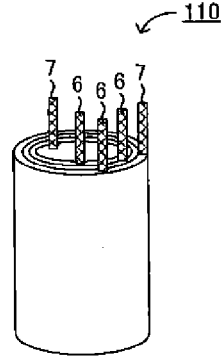
FIG. 16 is yet another perspective view explaining an all solid state battery element to be used for an all solid state battery of a second embodiment.

The series roll-up type element 110 as shown in FIG. 16 is obtained by performing such rolling up. In the all solid state battery element before the roll-up, a current collecting terminal 7 is preferably disposed on each of the end cathode current collector 21 and the end anode current collector 31.

According to the second embodiment, many power generating elements may be connected in series, so that the achievement of higher output may be attained. As compared with the laminated bipolar structure, the lamination number of the electrode is so small as to have the advantage of being broken with difficulty even when the element is rolled up. The voltage sensing terminal may be provided for the current collector exposed portion to facilitate quality control. In addition, the adjustment of the length of the current collector exposed portion restrains leakage current between cells.

3. Third Embodiment

Next, a third embodiment of the all solid state battery of the present invention is described. The all solid state battery element with the following constitution is used in the all solid state battery of the third embodiment.

The constitution of the all solid state battery element of the third embodiment has:

(I) an electrode body having a bipolar electrode basic structure having: a current collector, a cathode active material layer formed on one surface of the above-mentioned current collector, an anode active material layer formed on a surface of the above-mentioned current collector and formed in a position not overlapping with the above-mentioned cathode active material layer in a plan view, and a current collector exposed portion, formed between the above-mentioned cathode active material layer and the above-mentioned anode active material layer, and exposing both surfaces of the above-mentioned current collector;

(II) the above-mentioned current collector has: a backside cathode active material layer on a surface opposite to the surface where the above-mentioned cathode active material layer is formed, in a position overlapping with the above-mentioned cathode active material layer in a plan view, and a backside anode active material layer on a surface opposite to the surface where the above-mentioned anode active material layer is formed, in a position overlapping with the above-mentioned anode active material layer in a plan view;

(III) an end cathode structure having an end cathode current collector and an end cathode active material layer formed on the above-mentioned end cathode current collector, and an end anode structure having an end anode current collector and an end anode active material layer formed on the above-mentioned end anode current collector, in which the cathode active material layer of the above-mentioned electrode body and the end anode active material layer of the above-mentioned end anode structure are connected through a solid electrolyte membrane for connecting the end anode structure, and the anode active material layer of the above-mentioned electrode body and the end cathode active material layer of the above-mentioned end cathode structure are connected through a solid electrolyte membrane for connecting the end cathode structure; and (IV) the end cathode current collector of the above-mentioned end cathode structure has a backside end cathode active material layer on a surface opposite to a surface where the above-mentioned end cathode active material layer is formed, in a position overlapping with the above-mentioned end cathode active material layer in a plan view, and the end anode current collector of the above-mentioned end anode structure has a backside end anode active material layer on a surface opposite to a surface where the above-mentioned end anode active material layer is formed, in a position overlapping with the above-mentioned end anode active material layer in a plan view, in which at least one electrode surface of the above-mentioned all solid state battery element is provided with a solid electrolyte membrane for rolling up.

In addition, in the all solid state battery of the third embodiment, the all solid state battery element is rolled up using an end containing the above-mentioned end cathode active material layer, the above-mentioned cathode active material layer, the above-mentioned end anode active material layer and the above-mentioned anode active material layer as a starting point, and a roll-up direction thereof is orthogonal to a direction from the above-mentioned cathode active material layer towards the above-mentioned anode active material layer in the above-mentioned bipolar electrode basic structure.

Figure 17:
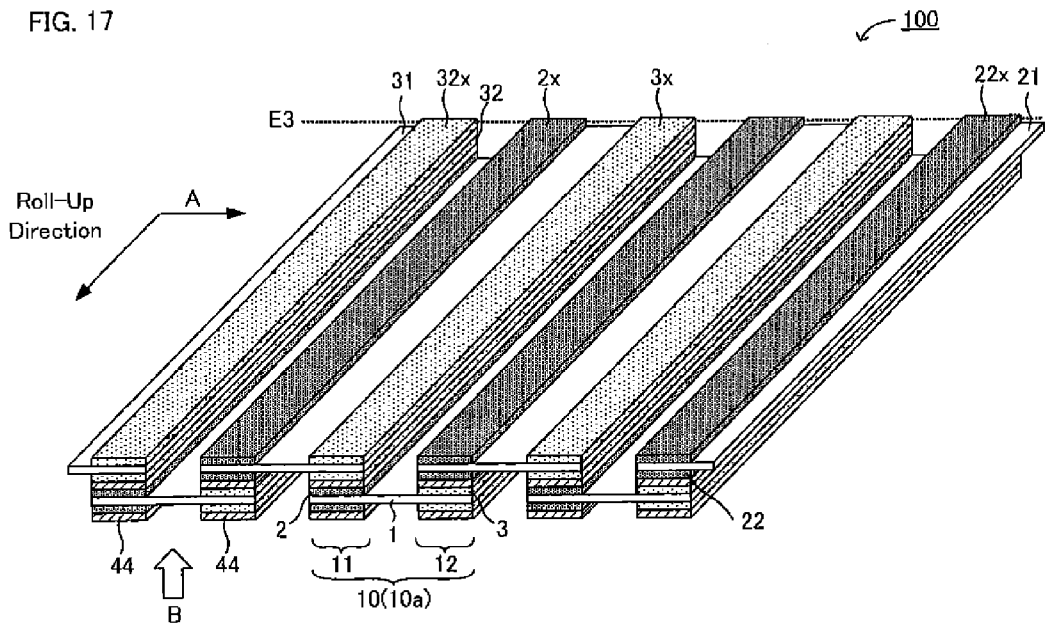
FIG. 17 is a perspective view explaining an all solid state battery element to be used for an all solid state battery of a third embodiment.

FIG. 17 is a perspective view explaining the all solid state battery element to be used for the all solid state battery of the third embodiment. The all solid state battery element 100 shown in FIG. 17 is the same element as the above-mentioned FIG. 10, and comprises the bipolar electrode basic structure 10a by plurality. The all solid state battery element 100 to be used may comprise the bipolar electrode basic structure 10a by only one. The cathode active material layer 2, the backside cathode active material layer 2x, the anode active material layer 3 and the backside anode active material layer 3x are formed on the current collector 1. The end cathode active material layer 22 and the backside end cathode active material layer 22x are formed on the end cathode current collector 21. The end anode active material layer 32 and the backside end anode active material layer 32x are formed on the end anode current collector 31. Here, the length (a length in a depth direction in the figure) of an electrode laminated body 11 including the cathode active material layer 2 is not particularly limited and preferably within a range of 50 cm to 20 m, for example. The width (a length in a crosswise direction in the figure) of the electrode laminated body 11 including the cathode active material layer 2 is preferably within a range of 50 mm to 300 mm, for example. The length and the width of an electrode laminated body 12 including the anode active material layer 3 are the same. The number of the bipolar electrode basic structures 10 is not particularly limited and is preferably within a range of 2 to 30 pieces, for example.

In FIG. 17, the all solid state battery element 100 is rolled up using an end E3 containing the end cathode active material layer 22, the cathode active material layer 2, the end anode active material layer 32 and the anode active material layer 3 as a starting point, and a roll-up direction thereof is orthogonal to a direction A from the cathode active material layer 2 towards the anode active material layer 3 in the bipolar electrode basic structure 10a. On this occasion, in rolling up the most left electrode laminated body in the figure, the backside end anode active material layer 32x is rolled up through the solid electrolyte membrane 44 for rolling up formed on a surface of the backside cathode active material layer 2x so as to contact with the backside cathode active material layer 2x.

Figure 18:
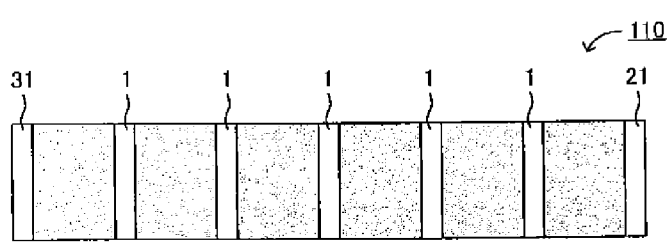
FIG. 18 is a schematic cross-sectional view explaining an all solid state battery element to be used for an all solid state battery of a third embodiment.
Figure 19:
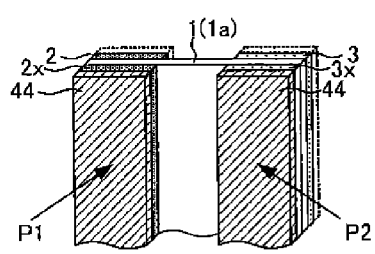
FIG. 19 is part of a view in which the all solid state battery element shown in FIG. 17 is observed from B direction.
Figure 20:
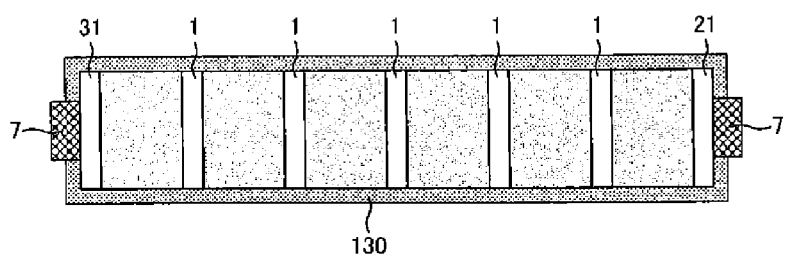
FIG. 20 is a schematic cross-sectional view explaining an all solid state battery of a third embodiment.

The parallel roll-up type element 110 as shown in FIG. 18 is obtained by performing such rolling up. FIG. 19 is part of a view in which the all solid state battery element 100 shown in FIG. 17 is observed from B direction. In the third embodiment, P1 and P2 need to be prevented from contacting. Thus, the length of the current collector exposed portion 1a is preferably 1 mm or longer, for example. In the third embodiment, as shown in FIG. 20, the short circuit is preferably prevented by using an insulating exterior body 130.

According to the third embodiment, the large-area all solid state battery element may be accommodated so compactly that the achievement of higher capacity may be attained. As compared with the laminated bipolar structure, the lamination number of the electrode is so small as to have the advantage of being broken with difficulty even when it is rolled up. The all solid state battery element may be formed into an elongated cylindrical shape and a square shape so easily as to be made into the all solid state battery excellent in heat dissipation.

4. Other Components

The all solid state battery of the present invention is not particularly limited if it has the above-mentioned all solid state battery element, and generally has an exterior body for accommodating the all solid state battery element. The exterior body is preferably selected properly in accordance with constitution and shape of the element, and may be an insulating exterior body or a non-insulating exterior body. In addition, the all solid state battery of the present invention generally has a current collecting terminal for performing current collection of all solid state battery element and a voltage sensing terminal for monitoring voltage.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

The invention claimed is:
1. An all solid state battery using an all solid state battery element having the following constitution:
(I) an electrode body comprising a bipolar electrode basic structure having: a current collector, a cathode active material layer formed on one surface of the current collector, an anode active material layer formed on a surface of the current collector and formed in a position not overlapping with the cathode active material layer in a plan view, and a current collector exposed portion, formed between the cathode active material layer and the anode active material layer, and exposing both surfaces of the current collector;
(II) the current collector has: a backside cathode active material layer on a surface opposite to the surface where the cathode active material layer is formed, in a position overlapping with the cathode active material layer in a plan view; and a backside anode active material layer on a surface opposite to the surface where the anode active material layer is formed, in a position overlapping with the anode active material layer in a plan view;
(III) an end cathode structure having an end cathode current collector and an end cathode active material layer formed on the end cathode current collector, and an end anode structure having an end anode current collector and an end anode active material layer formed on the end anode current collector,
in which the cathode active material layer of the electrode body and the end anode active material layer of the end anode structure are connected through a solid electrolyte membrane for connecting the end anode structure, and the anode active material layer of the electrode body and the end cathode active material layer of the end cathode structure are connected through a solid electrolyte membrane for connecting the end cathode structure;
(IV) the end cathode current collector of the end cathode structure has a backside end cathode active material layer on a surface opposite to a surface where the end cathode active material layer is formed, in a position overlapping with the end cathode active material layer in a plan view, and the end anode current collector of the end anode structure has a backside end anode active material layer on a surface opposite to a surface where the end anode active material layer is formed, in a position overlapping with the end anode active material layer in a plan view,
in which at least one electrode surface of the all solid state battery element is provided with a solid electrolyte membrane for rolling up; and
(V) the bipolar electrode basic structure by only one;
wherein the all solid state battery element is in a state of being rolled up using both an outside end of the end cathode structure and an outside end of the end anode structure as starting points,
an end cathode structure side roll-up region, where the backside end cathode active material layer is rolled up around the solid electrolyte membrane for rolling up so as to contact the backside anode active material layer through the solid electrolyte membrane, is formed by rolling up using the outside end of the end cathode structure as the starting point,
an end anode structure side roll-up region, where the backside end anode active material layer is rolled up around the solid electrolyte membrane for rolling up so as to contact the backside cathode active material layer through the solid electrolyte membrane, is formed by rolling up using the outside end of the end anode structure as the starting point, and an equipotential region formed by the current collector exposed portion of the bipolar electrode basic structure exists between the end cathode structure side roll-up region and the end anode structure side roll-up region.

2. An all solid state battery using an all solid state battery element having the following constitution:

(I) an electrode body comprising a bipolar electrode basic structure having: a current collector, a cathode active material layer formed on one surface of the current collector, an anode active material layer formed on a surface of the current collector and formed in a position not overlapping with the cathode active material layer in a plan view, and a current collector exposed portion, formed between the cathode active material layer and the anode active material layer, and exposing both surfaces of the current collector;

(II) the current collector has: a backside cathode active material layer on a surface opposite to the surface where the cathode active material layer is formed, in a position overlapping with the cathode active material layer in a plan view; and a backside anode active material layer on a surface opposite the surface where the anode active material layer is formed, in a position overlapping with the anode active material layer in a plan view;

(III) an end cathode structure having an end cathode current collector and an end cathode active material layer formed on the end cathode current collector, and an end anode structure having an end anode current collector and an end anode active material layer formed on the end anode current collector, in which the cathode active material layer of the electrode body and the end anode active material layer of the end anode structure are connected through a solid electrolyte membrane for connecting the end anode structure, and the anode active material layer of the electrode body and the end cathode active material layer of the end cathode structure are connected through a solid electrolyte membrane for connecting the end cathode structure; and (IV) the end cathode current collector of the end cathode structure has a backside end cathode active material layer on a surface opposite to a surface where the end cathode active material layer is formed, in a position overlapping with the end cathode active material layer in a plan view, and the end anode current collector of the end anode structure has a backside end anode active material layer on a surface opposite to a surface where the end anode active material layer is formed, in a position overlapping with the end anode active material layer in a plan view, in which at least one electrode surface of the all solid state battery element is provided with a solid electrolyte membrane for rolling up, wherein the all solid state battery element is in a state of being rolled up using an outside end of the end cathode structure or an outside end of the end anode structure as a starting point, and a roll-up direction thereof is parallel to a direction from the cathode active material layer towards the anode active material layer in the bipolar electrode basic structure, and a length of the current collector exposed portion of the bipolar electrode basic structure is the same as or longer than a perimeter of the bipolar electrode basic structure body not including the current collector exposed portion.

3. The all solid state battery according to claim 2, wherein a voltage sensing terminal is provided for the current collector exposed portion.

4. The all solid state battery according to claim 2, wherein the all solid state battery element comprises the bipolar electrode basic structure by only one.

5. The all solid state battery according to claim 2, wherein the all solid state battery element comprises the bipolar electrode basic structure by plurality, and the cathode active material layer of one bipolar electrode basic structure is connected to the anode active material layer of the other bipolar electrode basic structure through a solid electrolyte membrane for connecting the bipolar electrode basic structure.

6. The all solid state battery according to claim 1, wherein the solid electrolyte membrane contains a solid electrolyte comprising an inorganic compound.

7. The all solid state battery according to claim 2, wherein the solid electrolyte membrane contains a solid electrolyte comprising an inorganic compound.

8. The all solid state battery according to claim 1, wherein a deterioration control treatment for restraining the current collector from deteriorating due to charge and discharge is performed on at least one of a contact surface between the cathode active material layer and the current collector and a contact surface between the anode active material layer and the current collector.

9. The all solid state battery according to claim 2, wherein a deterioration control treatment for restraining the current collector from deteriorating due to charge and discharge is performed on at least one of a contact surface between the cathode active material layer and the current collector and a contact surface between the anode active material layer and the current collector.

10. The all solid state battery according to claim 8, wherein the deterioration control treatment is a plating treatment.

11. The all solid state battery according to claim 9, wherein the deterioration control treatment is a plating treatment.

* * * * *